United States Patent [19]

Murakami et al.

[11] Patent Number: 5,442,734
[45] Date of Patent: Aug. 15, 1995

[54] IMAGE PROCESSING UNIT AND METHOD FOR EXECUTING IMAGE PROCESSING OF A VIRTUAL ENVIRONMENT

[75] Inventors: Koichi Murakami; Katsuhiko Hirota; Soichi Nishiyama, all of Kawasaki, Japan

[73] Assignee: Fujitsu Limited, Kawasaki, Japan

[21] Appl. No.: 845,422

[22] Filed: Mar. 6, 1992

[30] Foreign Application Priority Data

Mar. 6, 1991 [JP] Japan .................................. 3-039732

[51] Int. Cl.⁶ .............................................. G06T 7/20
[52] U.S. Cl. .................................. 395/127; 395/119; 395/128
[58] Field of Search ............... 395/127, 128, 129, 119, 395/155, 158

[56] References Cited

U.S. PATENT DOCUMENTS

| | | | |
|---|---|---|---|
| 4,348,186 | 9/1982 | Harvey et al. ...................... | 395/127 |
| 4,685,070 | 8/1987 | Flinchbaugh ....................... | 395/139 |
| 4,862,388 | 8/1989 | Bunker ................................ | 395/127 |

FOREIGN PATENT DOCUMENTS 2201069 8/1988 United Kingdom .

OTHER PUBLICATIONS

Foley, J. D., "Intefaces for Advanced Computing," *Scientific American*, vol. 257, No. 4, Oct. 1987, New York, N.Y., pp. 83–90.

*Primary Examiner*—Mark K. Zimmerman
*Assistant Examiner*—Michael Smith
*Attorney, Agent, or Firm*—Staas & Halsey

[57] ABSTRACT

An image processing unit generates a virtual environment or an artificial reality by displaying a necessary image in accordance with movement of a view direction of a person on a head mounted display and comprises a sensor, an image processing portion, and a display. The sensor detects a view direction and generates a view vector, and the image processing portion comprises a view direction movement discriminator, a priority degree allocator, and a partial update portion. The view direction movement discriminator calculates a view direction movement vector from the difference from the two fetched view vectors. The priority degree allocator generates a projection vector by projecting the view direction movement, determines a priority degree at each divided section of the display screen to be higher when the projection vector approaches and to withdraw from the center of the display screen to a periphery along the projection vector; and the partial update portion updates the display of the display screen in each divided section in accordance with the priority degree.

10 Claims, 5 Drawing Sheets

| 20 | 18 | 14 | 13 | 5 |
|----|----|----|----|----|
| 22 | 24 | 19 | 12 | 4 |
| 21 | 23 | 25 | 11 | 3 |
| 17 | 16 | 15 | 10 | 2 |
| 6  | 7  | 8  | 9  | 1 |

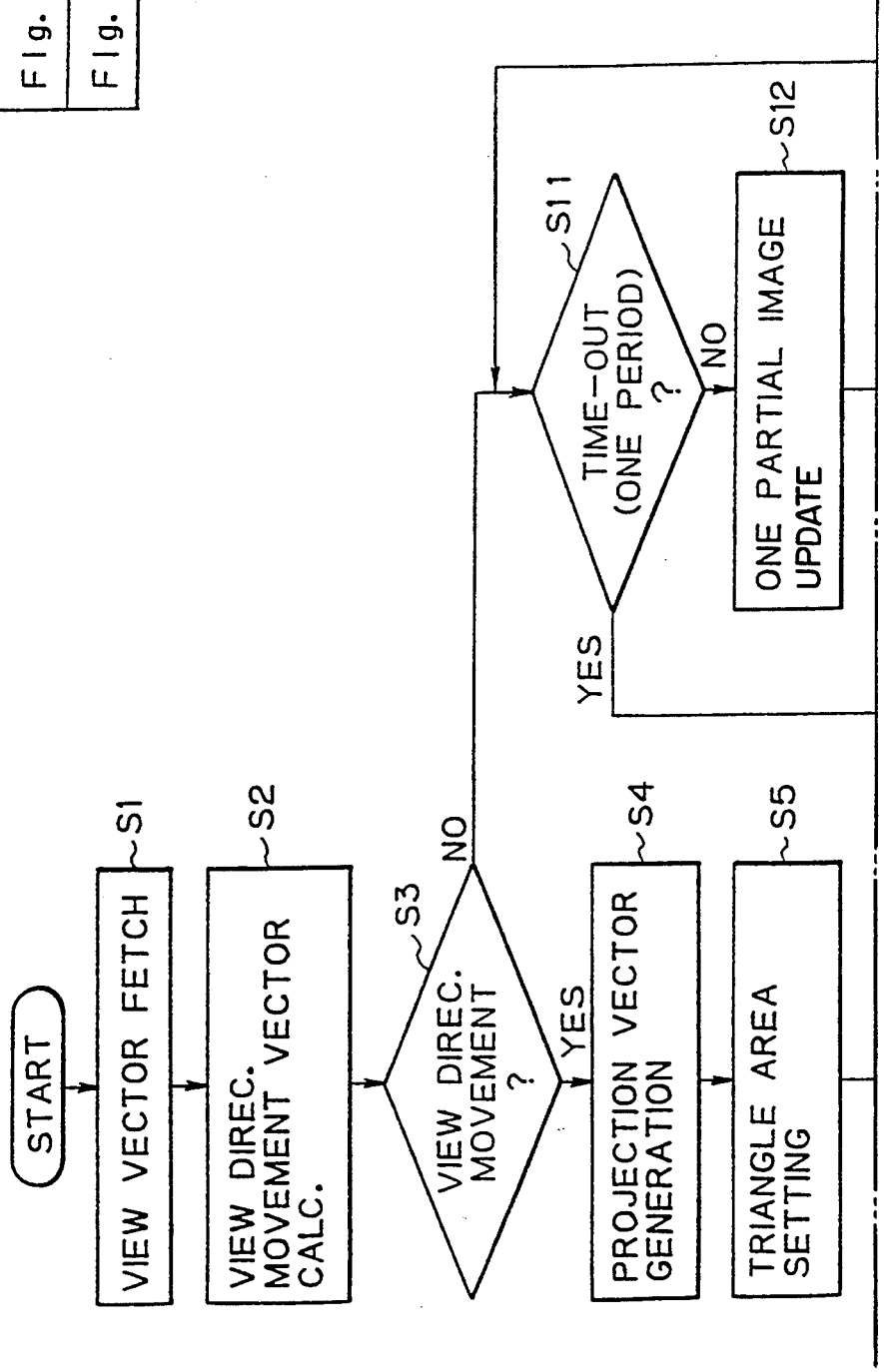

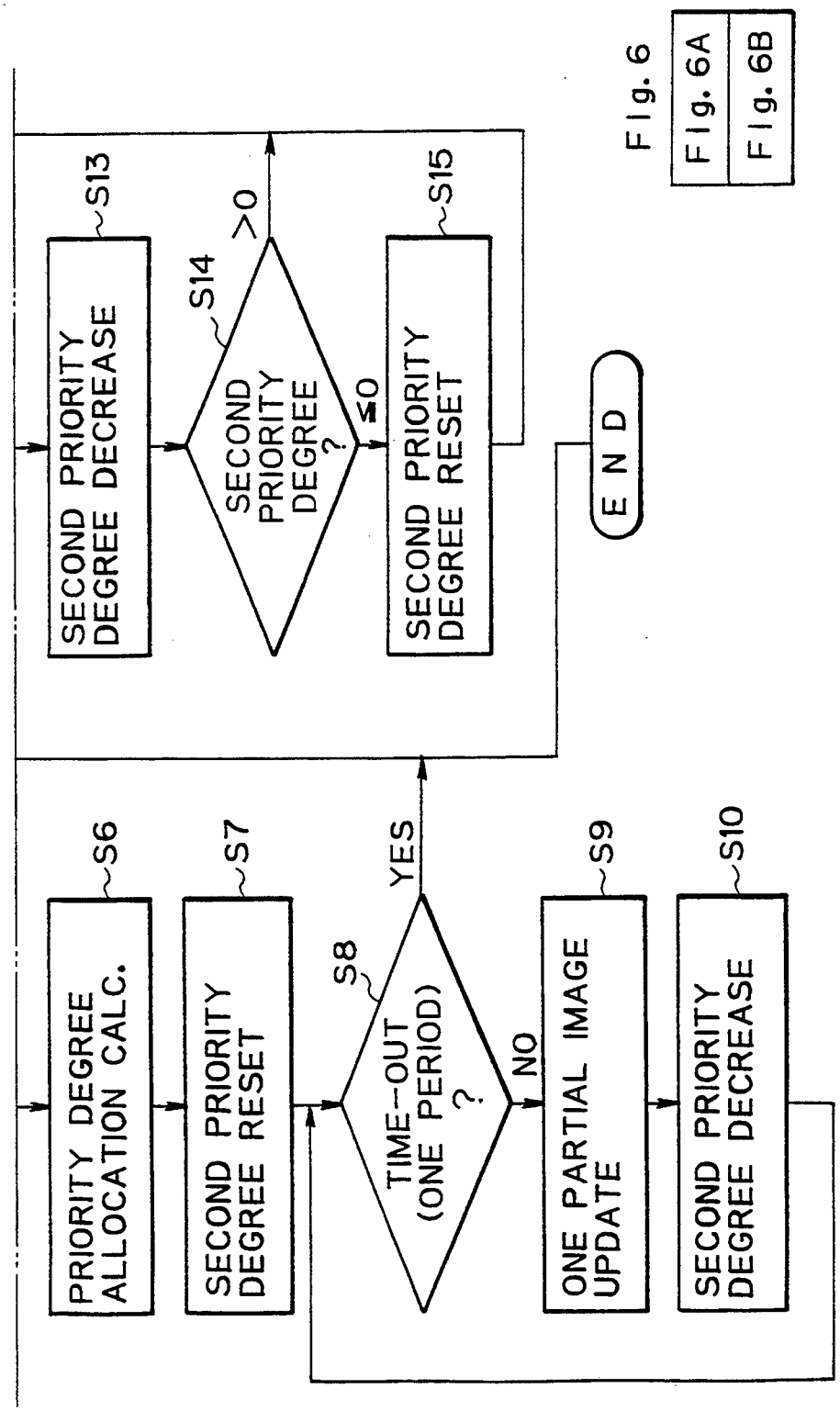

IMAGE PROCESSING UNIT AND METHOD FOR EXECUTING IMAGE PROCESSING OF A VIRTUAL ENVIRONMENT

BACKGROUND OF THE INVENTION

1. Field of the Invention

The present invention relates to an image processing unit and a method for executing image processing in a system wherein a virtual environment or artificial reality is generated, by displaying a necessary image in a head mounted display in response to a movement of a view direction of a person mounting the same.

2. Description of the Related Art

In the system generating the virtual environment or the artificial reality, regarding the sense of sight, an image processing unit generates the necessary stereo image using a computer graphic technique. The image is displayed on a head mounted display mounted on the head of a user and is updated in every instant in response to movement of the properly detected view direction.

The stereo image is displayed, for example, by generating separate left and right images corresponding to the view difference between both eyes, and the head mounted display is constituted such that watching the respective images by one eye only is possible.

To detect the movement of the view direction, a sensor mounted on the head and a signal source generating, for example, a magnetic signal or the like are used, position data and a direction or the like of the sensor with reference to the signal source are measured, whereby the position and the movement of the head are detected, and thus, the view direction is determined by the movement.

The updating of the image following the view direction is carried out by the determination of the view direction receiving a measured value at each period by the sensor, by the determination of a new image wherein the view direction is the center of the field of the vision, and by updating the new image in the display image.

In the updating of the image following the view direction, it takes a comparatively long time to generate the stereo image to cover one whole view field. For example, it takes at least about 100 milliseconds in each one frame.

On the other hand, the image must be changed at the speed of about 30 frames/second so that the person feels a natural movement for the moving image. The above updating time cannot satisfy the above request, and there arises the problem that a smooth moving image cannot be obtained.

SUMMARY OF THE INVENTION

An object of the present invention is to provide an image processing unit or method decreasing the processing time for the updating of the image in response to the movement of the view direction and shortening the updating interval of the display image.

According to a first aspect of the invention, there is provided an image processing unit comprising a sensor means for detecting a view direction of a person and for generating a view vector designating the view direction; and a display means having a display screen for displaying the image. The unit further comprises an image processing means for generating an image defined by the view vector in accordance with a given image data, and having a view direction movement discrimination means for fetching the view vector at a certain time interval, and for calculating a view direction movement vector designating a moving speed of the view direction form the difference from the latest two fetched view vectors Additionally, the unit comprises a priority degree allocation means for generating a projection vector by projecting the view direction movement vector on the display screen setting the center of the display screen as an origin, and for determining a priority degree at each divided section of the display screen to be higher when the projection vector approaches and decreases from the center of the display screen to a periphery along the projection vector; and a partial update means for updating the display of the display screen in each section by the image defined by the latest view vector, sequentially from the section having a higher priority degree.

According to a second aspect of the invention there is provided a method for executing an image processing comprising a 1st process step for fetching a view vector; a 2nd process step for calculating a view direction movement vector between a view vector fetched at the 1st process step and a stored view vector just before the fetched view vector at the 1st process step; a 3rd process step for comparing the magnitude of the view direction movement vector calculated at the 2nd process step with a certain value, and for determining whether the view direction movement exists or not, in the partial update means; a 4th process step, to which the 3rd process step proceeds when the view direction movement exists, for generating a projection vector projecting the view direction movement vector on a display screen and for generating a priority degree of each partial image, in a priority degree allocation means; a 5th process step for setting a triangle area on the display screen in accordance with the projection vector generated in the 4th process step; a 6th process step for calculating a priority degree in accordance with an overlap area between a triangle area and a divided section of the display screen, and the priority degree calculated at the 4th process step; a 7th process step for resetting a second priority degree as initial values; a 8th, 9th and 10th process steps for updating the divided partial images in accordance with the priority degree, for decreasing the priority degree of the updated partial image, and for repeating the above two processes of updating and decreasing until the process period attains a certain time; a 12th process step for updating the partial image having the highest priority degree until the process period attains a certain time in an 11th process step, to which the process proceeds when the view direction movement does not exist in the 3rd process step; a 13th process step for decreasing the second priority degree corresponding to the updated partial image after executing the 12th process step; a 14th process step for returning to the 11th process step if one of the second priority degrees of the partial image is greater than zero as a result of the 13th process step; a 15th process step, to which the process proceeds when all the second priority degrees of the partial image is less than zero as a result of the 13th process step, in the 14th process step, for resetting the second priority degree and for returning to the 11th process step; and an end process-step for ending the one process period when the process time attains the process period in the 8th process step on the 11th process step.

Other features and advantages of the invention will be apparent from the following description with reference to the accompanying drawings.

BRIEF DESCRIPTION OF THE DRAWINGS

FIGS. 6A and 6B are a flowchart of an example of processes in the embodiment of FIG. 1.

DESCRIPTION OF THE PREFERRED EMBODIMENTS

Prior to an explanation of the embodiments, a summary of this invention is explained with reference to the drawings.

Figures 2, 3:
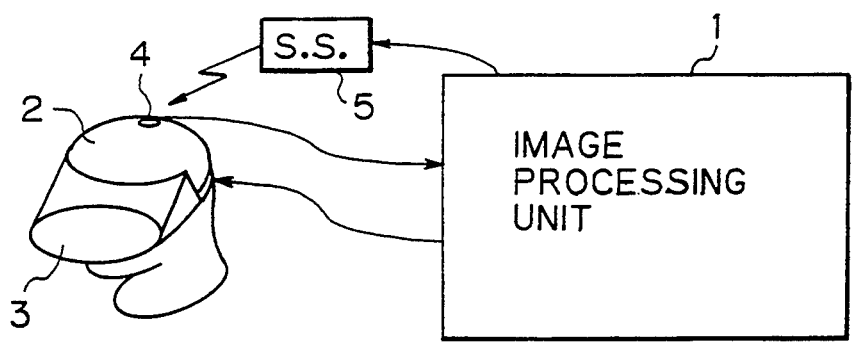
FIG. 2 is an explanatory diagram of a system including the image processing unit of FIG. 1 and a head mounted display.
FIG. 3 is an explanatory diagram illustrating a priority allocation for divided sections of a display screen.

In the system generating the virtual environment or the artificial reality, regarding a sense of sight, as shown in FIG. 2, an image processing unit 1 generates the necessary stereo image using a computer graphic technique. The image is displayed on a head mounted display 3 mounted on the head 2 of a user, and the image is updated in every instant in response to the movement of the properly detected view direction.

The stereo image is displayed, for example, by generating separate left and right images corresponding to the view difference between both eyes, and the head mounted display 3 is constituted such that watching the respective images by one eye only is possible.

To detect the movement of the view direction, a sensor 4 mounted on the head 2 and a signal source (S.S.) 5 generating, for example, a magnetic signal or the like is used and, position data and a direction or the like of the sensor 4 with reference to the signal source 5 are measured, whereby the position and the movement of the head are detected, and thus, the view direction is determined by the movement.

The updating of the image following the view direction is carried out by determination of the view direction receiving a measured value at each period by the sensor 4, by the determination of a new image wherein the view direction is the center of the field of vision, and by updating the new image in the display image.

Figure 1:
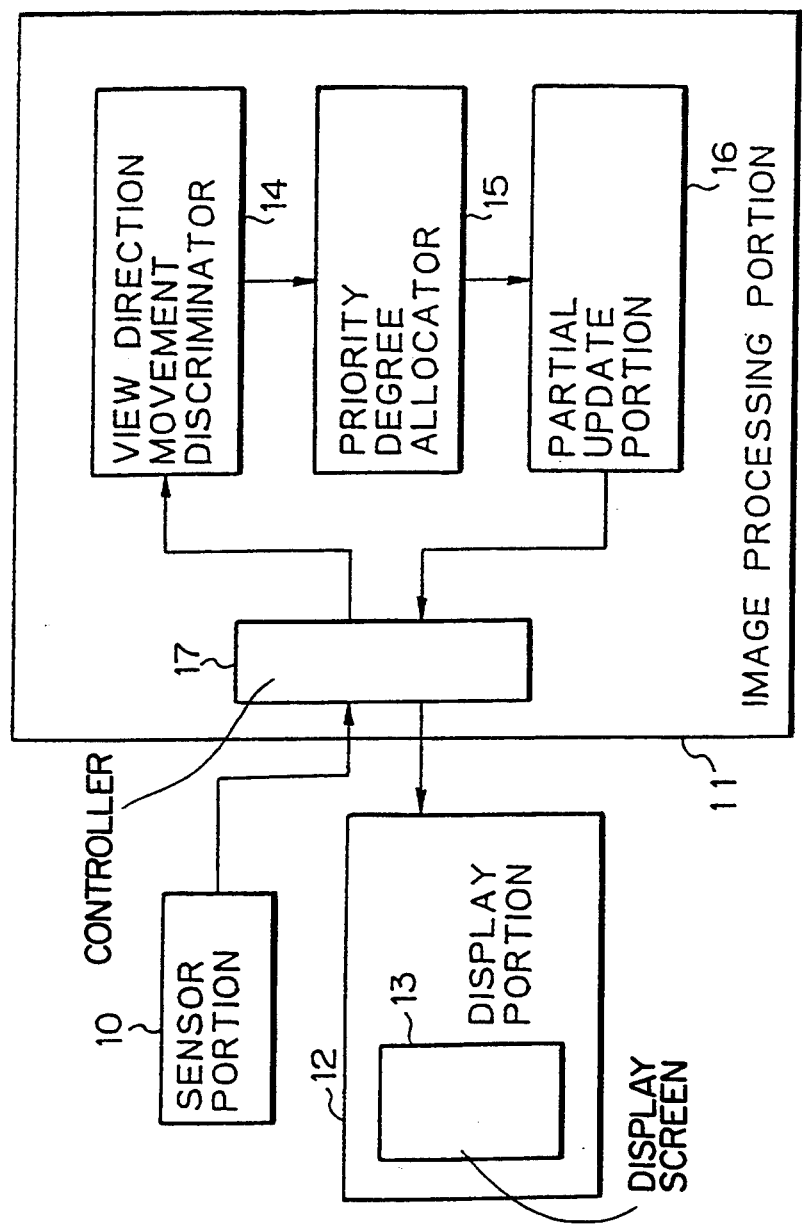
FIG. 1 is a block diagram of an image processing unit according to an embodiment of this invention.

FIG. 1 is a block diagram showing a constitution of an image processing unit according to an embodiment of the invention.

As shown in the figure, the image processing unit comprises a sensor portion 10, an image processing portion 11, and a display portion 12. The sensor portion 10 detects the view direction of a person and generates a view vector showing a view direction, and the image processing portion 11 generates the image defined by the view vector in accordance with a given image data, and displays the image on the display screen 13 of the display portion 12.

The image processing portion 11 comprises a view direction movement discriminator 14, a priority degree allocator 15, and a partial update portion 16. The view direction movement discriminator 14 fetches the view vector at a certain time interval. A view direction movement vector designating the moving velocity of the view direction, is calculated from the difference between the latest two fetched view vectors.

The priority degree allocator 15 projects the view direction movement vector as the center of the display screen 13 which is an origin on the display screen 13; generates a projection vector; and determines the priority degree of each divided section of the display screen 13 such that the priority degree is higher when the divided section is nearer to the projection vector and is lower when the divided section is more distant from the center to the periphery of the display screen along the projection vector.

The partial update portion 16 updates the image of the display screen 13 for each divided section in accordance with an image defined by the latest view vector, sequentially in order of higher priority degree.

Each divided section of the display screen 13 may be a rectangular portion divided by the same size and the same shape in the display screen 13.

The process in the priority degree allocator 15 introduces a plurality of isosceles triangles which have respective vertexes on the projection vector, have a base on a line on the display screen perpendicular to the projection vector at the origin, and have different areas. For each area divided by the triangles, a priority degree is determined. In accordance with the priority degree of the triangle area and an overlap area between the triangle area and the divided section, the priority degree of the divided sections is determined.

Further, the partial update portion 16 holds a second priority degree in each divided section of the display screen. When the update of each divided section is executed, the priority degree of the divided section is decreased by a certain value. When no movement of the view direction is distinguished by the view direction movement vector, the process of updating the image corresponding to the divided section in accordance with the priority degree is repeated during the state of no movement of the view direction.

In this image processing unit, the partial image directed to the view direction is updated with a priority. Accordingly, if the image updating following the view direction is executed at the short period, when the view direction moves, only the images of the divided section having a priority are updated.

When the view direction moves, the scope of watching is narrow, the low priority portion cannot be discriminated. By the above partial updating, an unnatural view is not generated, but rather by smooth updating of view directed portions, natural feeling improvements can be carried out.

On the other hand, when the movement of the view direction stops, the updating from the center of the field of view to the periphery is continued and all field of views can be updated, so that the whole image is rapidly updated for a current state.

An embodiment of the invention is explained below.

In FIG. 1, the view direction movement discriminator 14 receives data, for example, in each 30 millisecond period, from the sensor portion 10 through a controller 17, and as data at time t, a coordinate $(x, y, z)t$ designating the position of the head and a view vector $(Ex, Ey, Ez)t$ designating the view direction are obtained.

The view direction movement discriminator 14 holds the view vector $(Ex, Ey, Ez)t-1$ before one period, and by the following equation, the view direction movement vector (Vx, Vy, Vz) at time t is obtained and supplies the same to the priority degree allocator 15:

$$(Vx, Vy, Vz)_t = (Ex, Ey, Ez)_t - (Ex, Ey, Ez)_{t-1}.$$

The priority degree allocator 15, for example, as shown in FIG. 3, allocates a priority degree to the rectangular section of the display screen divided equally and in a lattice state, so that the portions along the projection vector which are projected by the view direction movement vector as shown by an arrow are processed with a priority.

Further, the priority degree allocator 15 projects the view direction movement vector to have the origin in the center of the plane of the display screen 13. For example, the projection vector being proportional to the length of the view direction movement vector is defined as an arrow in FIG. 4.

For example, the projection vector is divided into four portions, and four isosceles triangles wherein the respective vertexes are the divided points and the pointed end, and the common bases are a line passing through the origin of the projection vector and perpendicular to the projection vector, are introduced.

The ratio of the area of the respective triangles, for example, is defined as 1:4:9:16 wherein the inner most triangle is the smallest and the outermost triangle is the largest. Accordingly, if the movement of the view direction is high speed, namely, the projection vector is long, the respective triangles are slender.

Figures 4, 5:
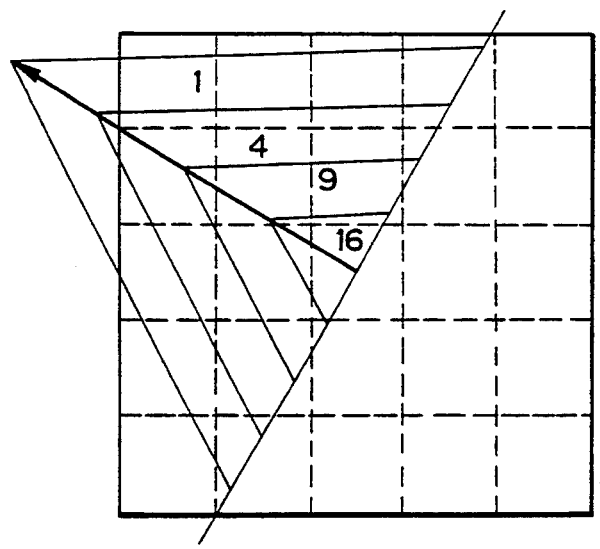
FIG. 4 is an explanatory diagram illustrating a calculation of a priority degree.
FIG. 5 is an explanatory diagram illustrating a priority allocation of a second priority degree.

For the area of the innermost triangle and the respective portions between the respective four triangles, the priority degrees are defined, for example, as shown in FIG. 4 so that the innermost triangle is greatest and is lower for the outer portions in sequence.

After the above preparation, in each divided section in the display screen, a value is calculated using the overlap area between the divided section and the area defined by the triangle and the allocated priority degree for the area so that the value is proportional to the overlap area and the priority degree. The calculated value and the priority degree in FIG. 3 are added and the priority degree for the divided section is defined.

As mentioned above, if the movement of the view direction is rapid, a comparatively high priority degree is given narrow and long along the direction of the movement. If the movement of the view direction is slow, a comparatively wide area near the center has a high priority degree.

The partial update portion 16 sequentially updates the divided section in accordance with the defined priority degree, supplies display information to the display portion 12 through the controller 17, and partially updates the display of the display screen 13. These processes are executed for each divided section as much as possible until the update by the next view direction movement vector starts.

Also, the partial update portion 16, for example, has a second priority degree wherein the priority degree is highest in the center and is lower sequentially to the periphery for each divided section in the display screen 13, and after the update of a divided section ends, the second priority degree of the section is lowered by a certain value, and the processed section lowers the priority so that the processed section has a lower priority degree than the other sections.

Thus, when the process of the next period starts, an absolute value of the view direction movement vector is compared with a threshold value. If the absolute value is less than the threshold value, it is determined that the view direction movement does not exist, and at that time the update process is carried out in accordance with the above second priority degree. This process continues similarly after this period as long as the view direction movement does not exist. Then, if all the second priority degrees are less than zero or when the movement of the view direction exists, the second priority degree returns to the initial value. An example of the initial value of the second priority degree is shown in FIG. 5.

FIG. 6 shows a flowchart of the above processes. When the view direction movement discriminator 14 fetches the view vector from the sensor portion 10 at a process step S1 after the process start in each process period, the view direction movement vector is calculated as a difference between the fetched view vector and a stored view vector which was fetched just before the view vector was fetched in process step S1, and the currently fetched view vector is stored.

The partial update portion 16 determines whether the view direction movement exists or not by the view direction movement vector in a process step S3, and if the view direction movement exists, the process proceeds to a process step S4. In the process step S4, the priority degree allocator 15 generates the projection vector projecting the view direction movement vector on the display screen, sets the above triangle area on the display screen in accordance with the projection vector in a process step S5, and the priority degree of each divided section is calculated and determined in accordance with the overlapped area between the triangle area and the divided section of the display screen, in a process step S6.

In a process step S7 the second priority degree is set as an initial value. In a process step S8 a time-out is checked; in a process step S9 the update of the highest priority degree divided section is executed; and in a process step S10, the reduction of the second priority degree of the updated section is executed sequentially When one period is passed the process during that one period ends.

If no movement is determined in the process step S3, a time-out is checked in a process step S11. The update of each section of the display screen having the highest second priority degree is executed in a process step S12; the second priority degree of the updated section is reduced in a process step S13; and the above processes are sequentially processed, and when proceeding to the next period, the process period ends.

During the above processes, when all the second priority degrees are less than zero in a process step S14, the second priority degree is reset to the initial value in a process step S15.

By using this invention, in the image processing unit in the system generating the virtual environment, the updating time interval of the image in response to the movement of the view direction can be shortened, therefore, the natural image following the view direction movement can be generated.

We claim:

1. An image processing unit comprising:
    sensor means for detecting a view direction of a person and for generating a view vector indicative of the view direction;

display means having a display screen for displaying an image on the display screen, said display screen having a center; and image processing means for generating an image defined by the view vector in accordance with given image data, said image processing means comprising:

view direction movement discrimination means for fetching the view vector at a certain time interval, and for calculating a view direction movement vector designating a moving speed of the view direction based on the difference between the latest two fetched view vectors;

priority degree allocation means for receiving the view direction movement vector and for generating a projection vector by projecting the view direction movement vector on the display screen, setting the center of the display screen as an origin, dividing the display screen into a selected number of sections, each divided section having a priority degree and for determining the priority degree for each divided section of the display screen such that the priority degree is higher when the projection vector approaches the divided section and lower as the projection vector is more distant from the center of the display screen to a periphery of the display screen along the projection vector; and partial update means for updating the display of the display screen in each divided section by the image defined by the latest view vector, sequentially from the section having a higher priority degree.

2. An image processing unit as set forth in claim 1 wherein said each divided section of the display screen is a divided rectangle section having the same size and the same shape.

3. An image processing unit as set forth in claim 1, wherein said generating, dividing and determining in said priority degree allocation means introduce a plurality of isosceles triangles which have respective vertexes on the projection vector, have a base on a line on the display screen, said line being perpendicular to the projection vector at the origin, and have different areas;

said priority degree allocation means further determines a priority degree for each area divided by at least one of the isosceles triangles, and said priority degree allocation means determines, in accordance with the priority degree determined for the isosceles triangle area, the corresponding priority degree of the divided sections.

4. An image processing unit as set forth in claim 3, wherein:

said partial update means holds a second priority degree in each divided section of the display screen;

when the update of the display screen in each divided section is executed, said partial update means reduces the priority degree of the divided section by a certain value; and when no movement of the view direction is detected by the view direction movement vector, said partial update means repeatedly updates the image corresponding to the divided section in accordance with the priority degree while no movement of the view direction is detected.

5. An image processing unit as set forth in claim 2, wherein said generating, dividing and determining in said priority degree allocation means introduce a plurality of isosceles triangles which have respective vertexes on the projection vector, have a base on a line on the display screen, said line being perpendicular to the projection vector at the origin, and have different areas;

said priority degree allocation means further determines a priority degree for each area divided by at least one of the isosceles triangles, and said priority degree allocation means determines, in accordance with the priority degree determined for the isosceles triangle area, the corresponding priority degree of the divided sections.

6. An image processing unit as set forth in claim 4, wherein:

said partial update means holds a second priority degree in each divided section of the display screen;

when the update of the display screen in each divided section is executed, said partial update means reduces the priority degree of the divided section by a certain value; and when no movement of the view direction is detected by the view direction movement vector, said partial update means repeatedly updates the image corresponding to the divided section in accordance with the priority degree while no movement of the view direction is detected.

7. An image processing unit as set forth in claim 1, wherein:

said partial update means holds a second priority degree in each divided section of the display screen;

when the update of the display screen in each divided section is executed, said partial update means reduces the priority degree of the divided section by a certain value; and when no movement of the view direction is detected by the view direction movement vector, said partial update means repeatedly updates the image corresponding to the divided section in accordance with the priority degree while no movement of the view direction is detected.

8. An image processing unit as set forth in claim 2, wherein:

said partial update means holds a second priority degree in each divided section of the display screen;

when the update of the display screen in each divided section is executed, said partial update means reduces the priority degree of the divided section by a certain value; and when no movement of the view direction is detected by the view direction movement vector, said partial update means repeatedly updates the image corresponding to the divided section in accordance with the priority degree while no movement of the view direction is detected.

9. An image processing method comprising:

a 1st process step for fetching a view vector;

a 2nd process step for calculating a view direction movement vector between a view vector fetched in the 1st process step and a stored view vector fetched, one period before the view vector fetched in the 1st process step;

a 3rd process step for comparing the magnitude of the view direction movement vector calculated at the 2nd process step with a certain value, for determining whether a view direction movement exists and for proceeding to a 4th process step if said view direction movement is determined to exist and to an 11th process step when said view direction movement is determined not to exist, said 4th process step generating a projection vector projecting the view direction movement vector on a display screen and generating a partial image priority degree for each partial image;

a 5th process step for setting a triangle area on the display screen in accordance with the projection vector generated in the 4th process step;

a 6th process step for calculating an area priority degree in accordance with an overlap area between a triangle area and a divided section of the display screen, and the partial image priority degree calculated in the 4th process step, for each area;

a 7th process step for resetting second priority degrees to initial values;

an 8th process step for determining if a process period has attained a certain time and for proceeding to a 9th process step if said process period has not attained the certain time and to an end process, if said process period has attained a certain time said 9th process step updating each partial image in accordance with the area priority degree;

a 10th process step for decreasing the partial image priority degree of the updated partial image and for returning to said 8th process step for repeating the process steps of updating and decreasing until the process period attains the certain time;

an 11th process step for determining if a process period has attained the certain time and for proceeding to a 12th process step if said certain time has been attained and proceeding to the end process step if said certain time has not been attained, said 12th process step updates the partial image having the highest priority degree, said partial image having a corresponding second priority degree;

a 13th process step for decreasing the second priority degree corresponding to partial image updated in the 12th process step; and a 14th process step for returning to the 11th process step if one of the second priority degrees of the updated partial images is greater than zero as a result of the 13th process step and for proceeding to a 15th process step when all the second priority degrees of the partial images are less than zero as a result of the 13th process step, said 15th process step resetting all the second priority degrees and returning to the 11th process step, said end process ending the one process period when said process period attains the certain time in one of said 8th process step and said 11th process step.

10. An image processing method as set forth in claim 9, wherein said 5th process step for setting a triangle area comprises:

processes introducing a plurality of isosceles triangles which have respective vertexes on the projection vector, have a base on a line on the display screen perpendicular to the projection vector at the origin, and have different areas; determining a priority degree for each area divided by the triangles; and determining the corresponding priority degree of the divided sections in accordance with the priority degree of the triangle area.

* * * * *

UNITED STATES PATENT AND TRADEMARK OFFICE
CERTIFICATE OF CORRECTION

PATENT NO.   : 5,442,734
DATED        : Aug. 15, 1995
INVENTOR(S)  : MURAKAMI et al.

It is certified that error appears in the above-indentified patent and that said Letters Patent is hereby corrected as shown below:

Col. 5,   line 60, after "each" delete ",".

Signed and Sealed this

Twelfth Day of March, 1996

Attest:

BRUCE LEHMAN

Attesting Officer          Commissioner of Patents and Trademarks